United States Patent [19]

Higuchi

[11] Patent Number: 4,694,401

[45] Date of Patent: Sep. 15, 1987

[54] APPARATUS FOR FORMING DIVERSE SHAPES USING A LOOK-UP TABLE AND AN INVERSE TRANSFER FUNCTION

[75] Inventor: Toshiro Higuchi, Yokohama, Japan

[73] Assignee: Research Development Corporation of Japan, Tokyo, Japan

[21] Appl. No.: 579,825

[22] Filed: Feb. 13, 1984

[30] Foreign Application Priority Data

Mar. 31, 1983 [JP] Japan .................................. 58-53905

[51] Int. Cl.⁴ .............................................. G06F 15/46
[52] U.S. Cl. ...................................... 364/475; 364/553
[58] Field of Search ................ 364/475, 553; 318/632; 82/2 B

[56] References Cited

U.S. PATENT DOCUMENTS

| | | | |
|---|---|---|---|
| 4,198,677 | 4/1980 | Brunner | 364/571 |
| 4,315,319 | 2/1982 | White | 364/553 |
| 4,365,304 | 12/1982 | Ruhman | 364/553 |
| 4,395,752 | 7/1983 | Hirosawa | 364/553 |
| 4,502,108 | 2/1985 | Nozawa | 318/632 |
| 4,504,772 | 4/1985 | Matsuura | 318/632 |
| 4,517,503 | 5/1985 | Lin et al. | 318/632 |

OTHER PUBLICATIONS

European Patent Search Report; 0121310.

Primary Examiner—Jerry Smith
Assistant Examiner—Allen MacDonald
Attorney, Agent, or Firm—Armstrong, Nikaido, Marmelstein & Kubovcik

[57] ABSTRACT

Where a rotating device, for example, such as a lathe, a pen-recorder, etc., is used to depict a non-circular shape, a position of a cutting tool, a pen, etc. is controlled by a method such as NC (numerical control). Generally, delay in control occurs due to the transmission characteristic of the control system, thus producing a distortion in the formed shape. This distortion can be removed by inserting an element having a reverse transmission characteristic into the control system.

3 Claims, 16 Drawing Figures

APPARATUS FOR FORMING DIVERSE SHAPES USING A LOOK-UP TABLE AND AN INVERSE TRANSFER FUNCTION

BACKGROUND OF THE INVENTION

1. Field of the Invention

This invention relates to an apparatus for processing articles of diverse shapes by numerical control, and particularly to the correction of delay of a positioning mechanism thereof.

2. Description of the Prior Art

Generally, articles of non-circular cross sectional shape are processed by a milling machine or the like, but these machine tools are considerably inferior to the lathe in view of processing efficiency. On the other hand, the lathe processing, which is a processing method for cutting article by a cutting tool secured to a tool rest, is high in processing efficiency but articles obtained therefrom are limited to those having a circular cross section.

Therefore, there is a demand that articles having a sectional shape close to a relatively circular shape as shown in FIG. 1, for example, such as cams, swage processing rolls and the like are processed efficiently.

To this end, it is necessary to reciprocate a cutting tool 2 in an X direction in synchronism with rotation with a spindle 1 of the lathe, as shown in FIGS. 2 and 3, which are in the form of a conceptual view. That is, a contour of the articles as an object assumes a closed curve at a certain feed position Z as shown in FIG. 1(b). If the closed curve is represented by $r = f(\theta)$ using polar coordinates $(r, \theta)$, it is necessary to give the valve of r as a function of the rotational angle $\theta$ of the spindle 1 to control the nose position X of the tool 2 so as to satisfy with said value.

Actually, the command value for positioning is used by converting it to $X = f(\theta) + A$ or $X = B - f(\theta)$ by the designation of the amount of shift A, B of the origin of the positioning system and the positive and negative directions.

To control positioning the tool as described above, a servo system which input is a contour model by a hydraulic servo mechanism has been principally used. However, in this hydraulic contour mechanism, the contour model rotated in synchronism with the spindle is made to be a mechanical input of the hydraulic servo mechanism, and therefore, a contour model had to be fabricated for every shape of article. One proposal has been realized in which a cam mechanism is used to synchronize the spindle with the position of the tool rest. However, this proposal was not suitable for diversification of products likewise the case which uses the contour model.

To freely change the shape of article in order to cope with diversification of article, if the positioning control of the tool rest in the X direction is carried out by numerical control, the change of shape can be performed merely by changing a program.

Recently, some examples wherein the lathe is subjected to the numerical control have been proposed. However, these have drawbacks in that the rotational speed of the spindle is very slow, and the processing efficiency is extremely low despite the fact that the lathe is especially used.

In this numerical control (NC), the rotational angle $\theta$ of the spindle is detected by an angle detector such as an encoder, and the value $f(\theta)$ of r stored in a memory of a control device is put out to the value of the detected $\theta$ thereby obtaining the command value for positioning the tool.

One example of this construction is shown in FIG. 4. An encoder is mounted on a rotational shaft 1 of the spindle, and N pulses are released per revolution of the encoder. On the other hand, the following data are successively stored in N memories to repeatedly successively call memories every time the pulse is received from the encoder:

$$f\left(\frac{2N\pi}{N}\right)$$

where n = 1 to N

The output enters a positioning servo mechanism in an X direction of a tool rest 3 such as an electric-hydrualic servo mechanism through a D/A converter. It is of course noted that when a computer having a capacity of high speed calculation is used, a program for calculating $f(\theta)$ with respect to $\theta$ can be employed instead of storing $f(\theta)$ into the memory.

The positioning servo mechanism in the X direction of the tool rest 3 requires power and high-speed responsiveness overcoming the cutting resistance. For that purpose, the electric-hydraulic servo mechanism is suitably used, but an excellent servo actuator such as a high output servo motor can be used, if available. Reference numerals 4 and 5 denote a servo valve and a servo cylinder, respectively, which constitute an electric-hydraulic servo mechanism. A reference numeral 6 denotes a connecting rod.

In such a positioning servo system, the transmission characteristic between input and output, that is, between the command value and actual position, is given by $$Y(s) = T(s)R(s) \tag{1}$$

where R(s) is input, Y(s) is output and T(s) is transmission function, and $$T(s) = \frac{K}{1 + a_1 s + a_2 s^2 + a_3 s^3 +} \tag{2}$$

(where K, $a_1$-$a_n$ are constant, generally, K = 1)

FIG. 5 shows one example of the transmission characteristic of the electric-hydraulic servo system.

As can be seen from the equation (2) and FIG. 5, in the positioning servo system, generally, if the frequency of the input increases, delay in phase and reduction in amplitude occur.

Therefore, according to a conventional method wherein the value of $f(\theta)$ is merely made to be the input of the servo system with respect to the rotational angle $\theta$ of the spindle, where the number of revolutions of the spindle is high and $f(\theta)$ includes a high harmonic component with respect to $\theta$, it is not possible to form an exact contour due to the aforementioned delay in phase and reduction in amplitude, example of which is shown in FIGS. 6(a) and (b). The input valve (target contour) is indicated by the dotted lines and the output value is indicated by the solid lines. This is the main reason why the spindle can be rotated only at a low speed.

SUMMARY OF THE INVENTION

This invention provides a method which can compensate for a delay in servo system and a reduction in gain to thereby render processing under high speed rotation and apparatus therefor.

By inserting a transmission element of K/T(s) in series with the servo system represented by Y(s)=T(s)R(s) as in the equation (1), the relation between the input and output is given by $$Y(s) = T(s) \cdot \frac{K}{T(s)} \cdot R(s) = KR(s) \quad (3)$$

whereby the servo system without involving the delay in phase and variation in amplitude can be obtained irrespective of any type of frequency component.

Actually, the transmission element of K/T(s) is arranged within a controlling computer, and the computer output is made to be given by $$U(s) = K/T(s) \cdot R(s) \quad (4)$$

which serves as the input of the servo system whereby making the output Y(s) of the servo system K·R(s). FIG. 7(a) is a block diagram of a conventional servo system and FIG. 7(b) is a block diagram of the servo system in accordance with the present invention.

Assume that time t is the variable, the following may be applied as a new input to the servo system in place of input r(t):

$$u(t) = r(t) + a_1 \frac{d}{dt} r(t) + a_2 \frac{d^2}{dt^2} r(t) + a_3 \frac{d^3}{dt^3} r(t) + \ldots \quad (5)$$

Assume that the rotational speed of the spindle of the lathe is small in variation with time, the following can be given:

$$\theta = \omega t,$$

thus $$u(\theta) = r(\theta) + a_1 \omega \frac{dr}{d\theta} + a_2 \omega^2 \frac{d^2 r}{d\theta^2} + a_3 \omega^3 \frac{d^3 r}{d r^3} + \ldots \quad (6)$$

$$= f(\theta) + a_1 \omega \frac{df(\theta)}{d\theta} + a_2 \omega^2 \frac{d^2 f(\theta)}{d\theta^2} +$$

$$a_3 \omega^3 \frac{d^3 f(\theta)}{d\theta^3} + \ldots$$

Here, $df(\theta)/d\theta$, $d^2 f(\theta)/d\theta^2$, $d^3 f(\theta)/d\theta^3$ and the like can be obtained in advance since the shape $f(\theta)$ to be formed is given.

Actually, the equation (2) can be sufficiently approximated to:

$$T(s) = \frac{K}{1 + a_1 s + a_2 s^2} \quad (7)$$

and therefore, the supplemental term of $u(\theta)$ in equation (6) with respect to $r(\theta)$ will suffice to be up to the quadratic term of $\omega$. Even if terms higher than $\omega^3$ are omitted, it is possible to obtain good accuracy in terms of practical use. It will be of course that if higher precision at the high speed region is required, suitable supplemental term higher than cubic can be employed. FIGS. 6(c) and (d) show examples where terms up to the quadratic are employed. If the harmonic component is included as in FIG. 6(d), there occurs a minor error but if terms up to the cubic are employed, such an error disappears.

DETAILED DESCRIPTION OF THE PREFERRED EMBODIMENTS

Figure 8A:
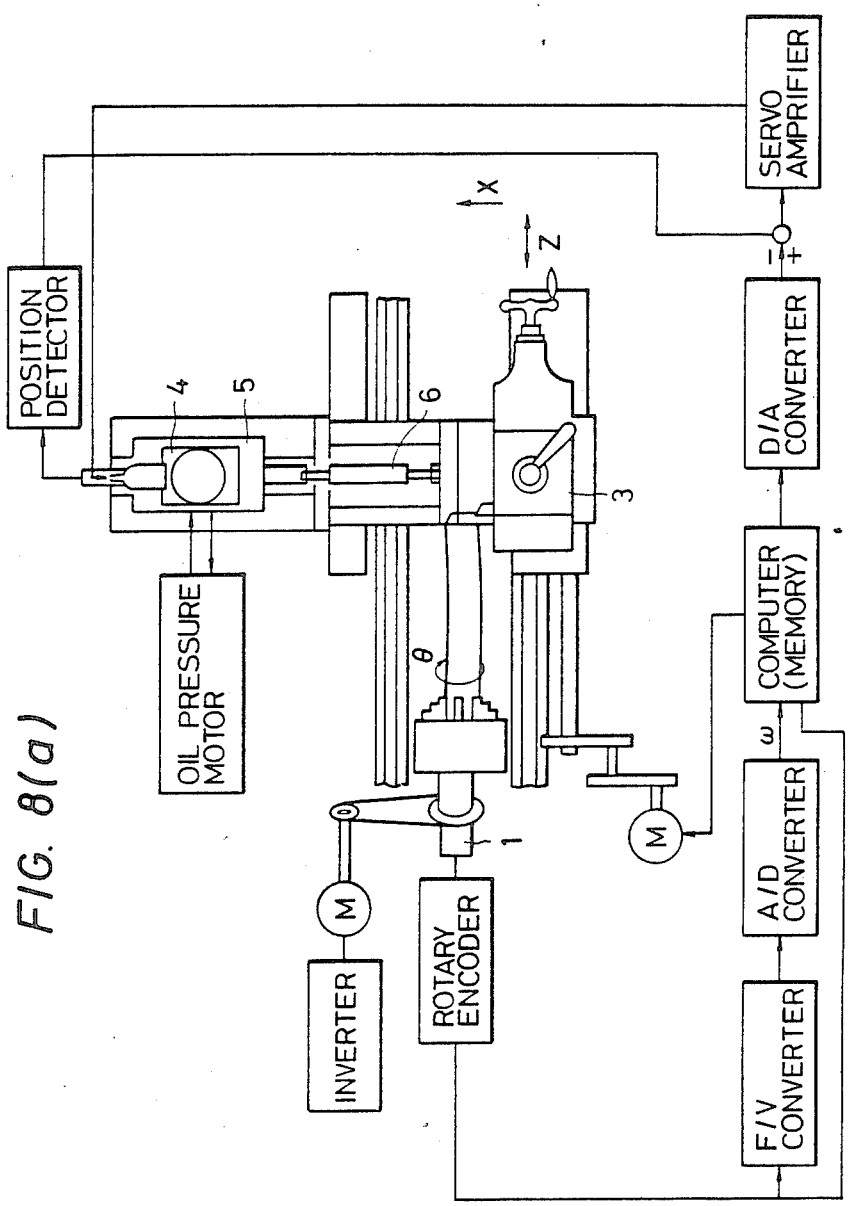
FIGS. 8(a) and 8(b) are block diagrams of a control circuit for the NC lathe in accordance with the invention.
Figure 8B:
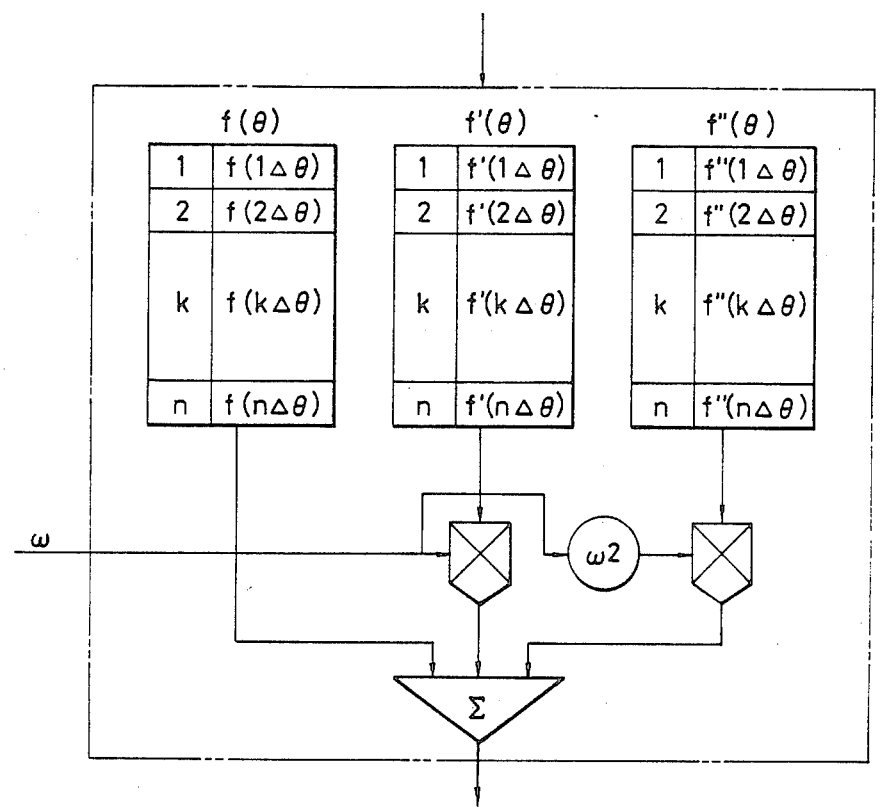

One example of the NC processing system on the basis of the above-described principle is shown in FIG. 8, FIG. 8(a) being a block diagram showing the schematic structure and FIG. 8(b) being a block diagram of the signal processing (procedure for calculating $u(\theta)$).

Values of $f(\theta)$, $df(\theta)/d\theta$, $d^2 f(\theta)/d\theta^2$ are calculated with respect to $\theta = 2n\pi/N$ (where n=1 to N) in accordance with the number N of pulses generated during one full rotation of the spindle 1 and are respectively prestored in memories of the computer. The value of N, which depends on the precision required, is approximately 500 to 6000.

The rotational speed $\omega$ of the spindle is detected from the period or frequency of the encoder mounted on the spindle and digitalized which is put into the computer. It is noted of course that the rotational speed $\omega$ of the spindle can be obtained for input by suitable methods such as by mounting a tachogenerator on the spindle 1 or from the number of revolutions of a motor for driving the spindle.

Figure 1A:
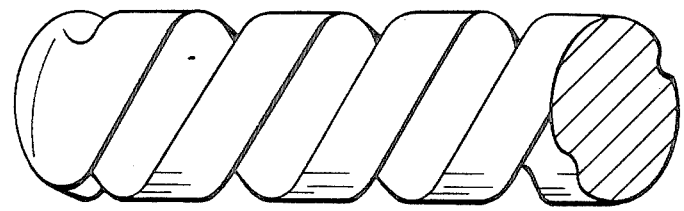
FIGS. 1(a), 1(b) and 1(c) are perspective views showing examples of processing contours in accordance with this invention.
Figure 1B:
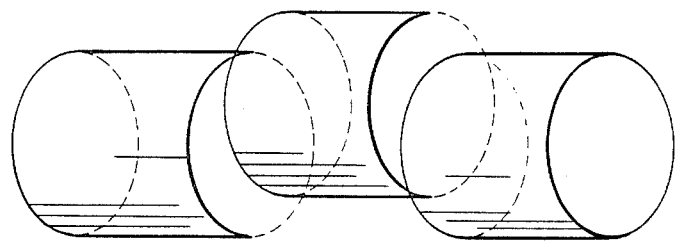
Figure 1C:
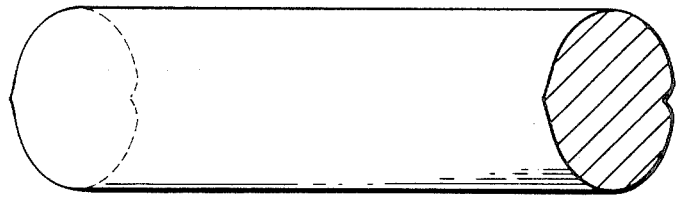
Figure 2:
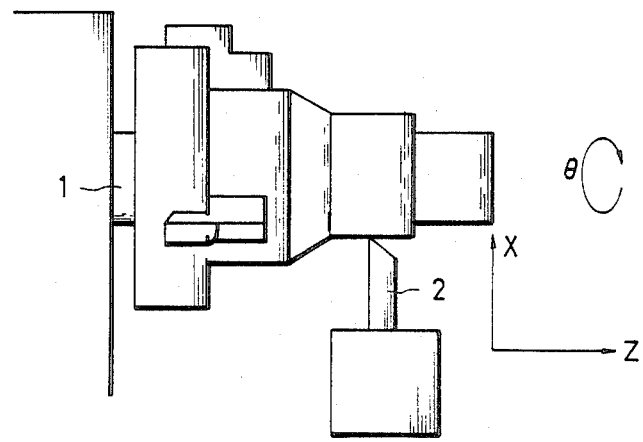
FIGS. 2 and 3 are cenceptual views showing one example of a controlling method in accordance with this invention.
Figure 3:
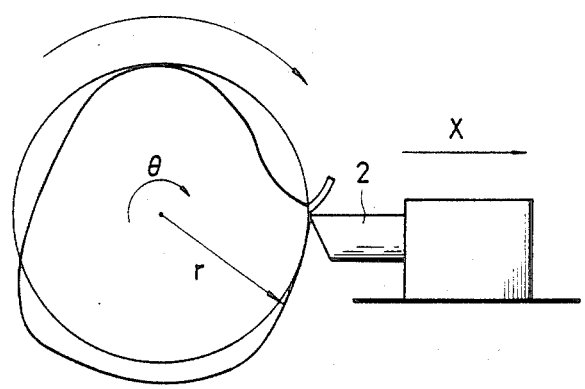
Figure 4:
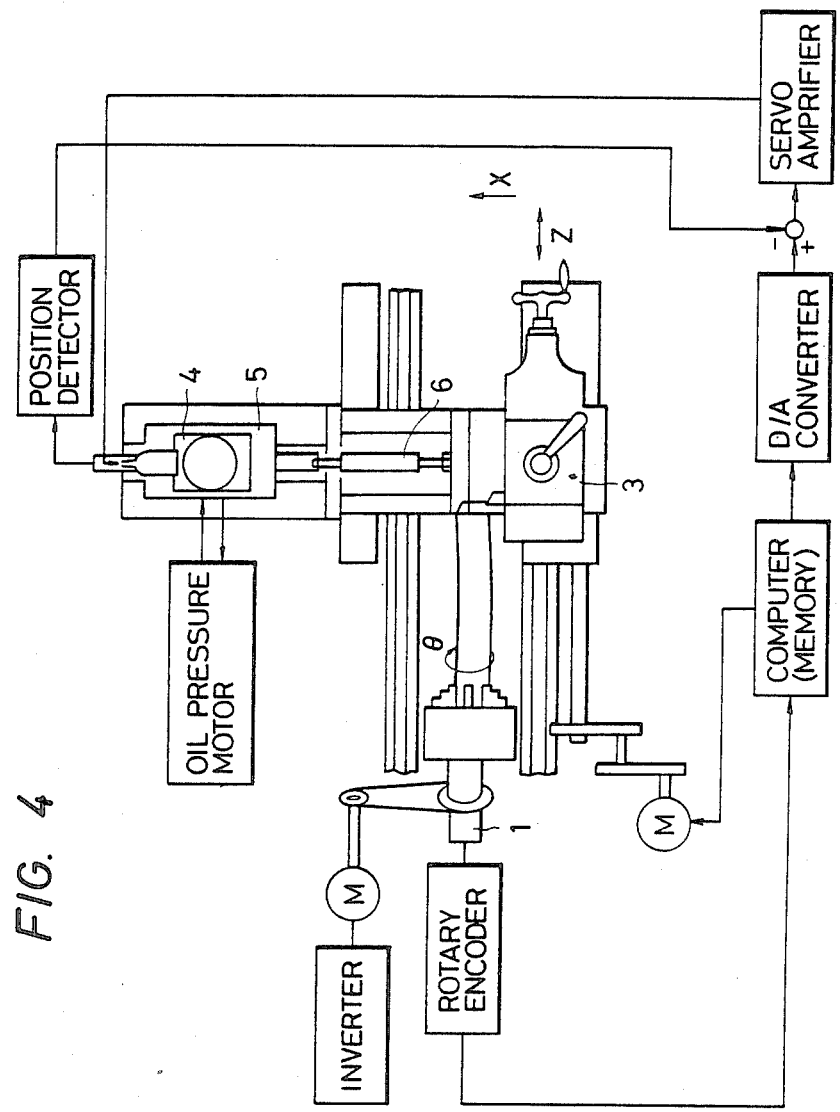
FIG. 4 is a block diagram of a control circuit for a conventional NC lathe.
Figure 5:
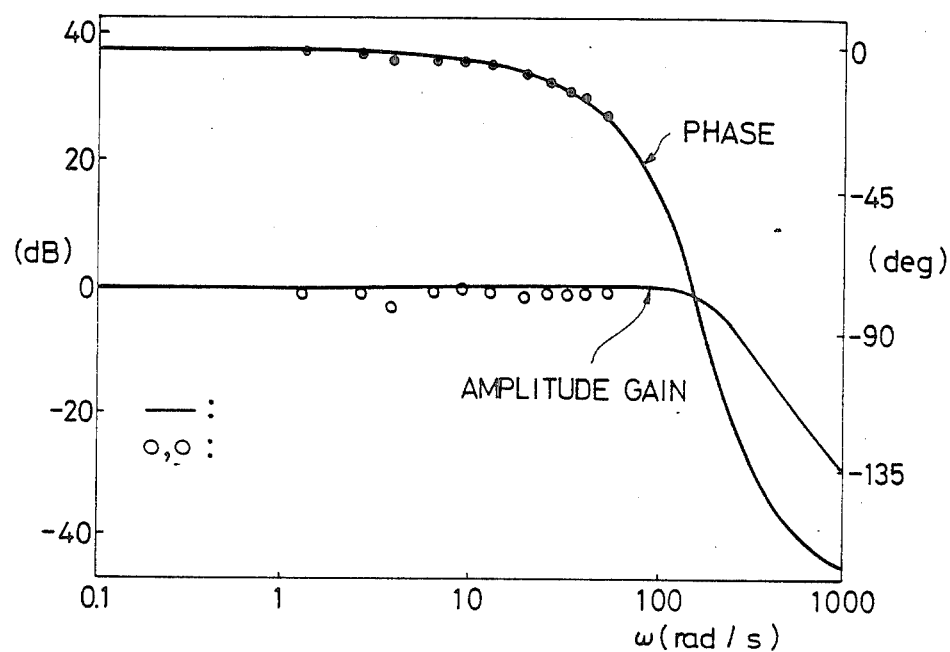
FIG. 5 is a control characteristic view.
Figure 9:
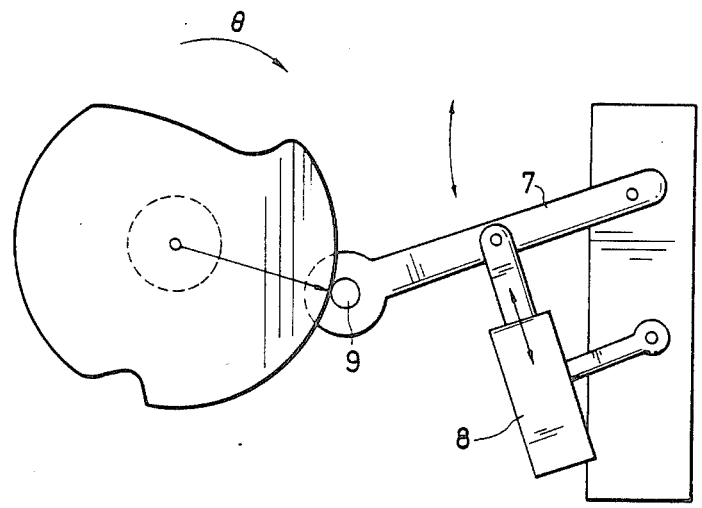
FIG. 9 is a structural view of an embodiment of cutting control.
Figure 6A:
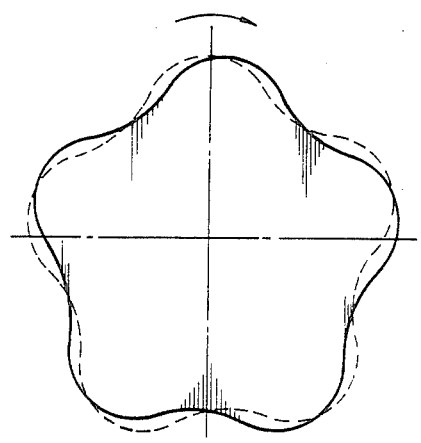
FIGS. 6(a), 6(b), 6(c) and 6(d) are explanatory views of examples of an error in control due to the control characteristic.
Figure 6B:
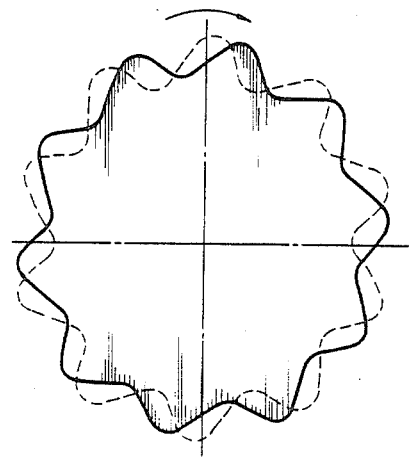
Figure 6C:
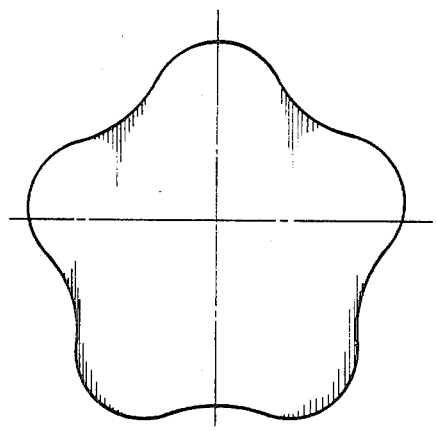
Figure 6D:
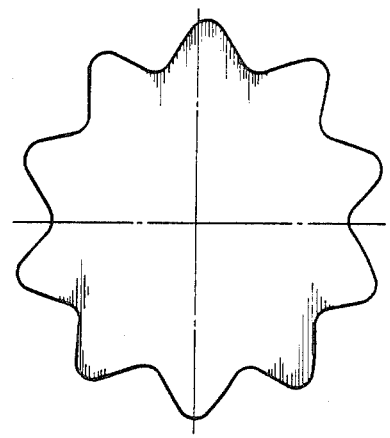
Figure 7A:
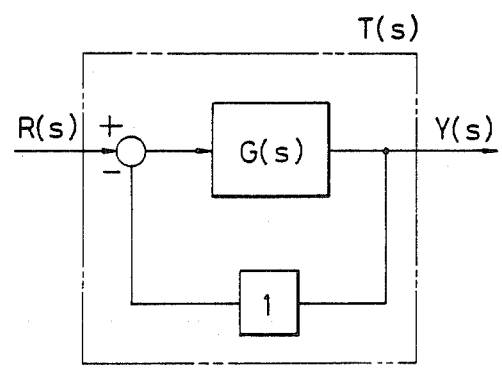
FIGS. 7(a) and 7(b) are block diagrams of a servo system.
Figure 7B:
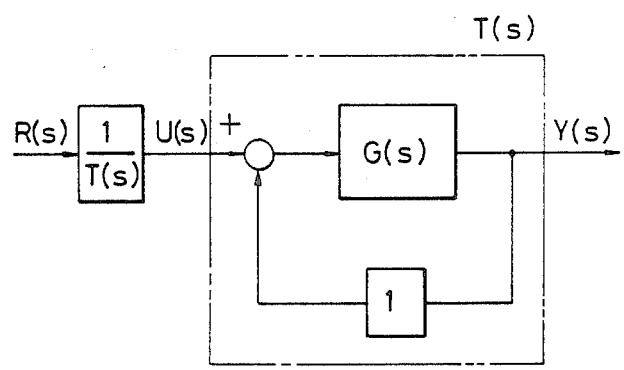

As the spindle rotates, $f(\theta)$, $f'(\theta)$ and $f''(\theta)$ are successively read every pulse of the encoder. With respect to $f'(\theta)$ and $f''(\theta)$, the value of $$u(\theta) = u(k\Delta\theta) \left( \Delta\theta = \frac{2\pi}{N} \right)$$

with respect to k(k=0 to N) is calculated by operation of addition after the product of $\omega$ and $\omega^2$ previously put-in is obtained, which value is made into the analog amount by the D/A converter to serve as the input into the positioning servo system.

Where the cubic term is employed in order to enhance the precision, the number of memories is increased, and the value of $f'''(\theta)$ is further stored in FIG. 8(b), to which product of the former and $\omega^3$ is added to obtain the value of $u(\theta)$.

Where there is no change in sectional shape in the Z direction as in FIG. 1(c), the aforesaid k=N is placed equal to k=0 and k=N is obtained, then memories can be successively repeatedly read from k=1. If f(θ) is varied with respect to the value in the feed direction Z, the three-dimensional shape as shown in FIG. 1(a) can be processed by the lathe.

In accordance with the present invention, as described above, lowering of processing precision resulting from the transmission function of the servo system may be avoided by inserting an element having the reverse transmission characteristic. For example, even if the rotational speed of the spindle of the lathe is approximately 10 to 1000 rpm, a contour which rarely has no deviation in phase and amplitude can be formed.

Where the number of revolutions of work is fixed, the corrected value of input u(θ) is calculated in advance, and the value u(θ) can be stored in the memory to thereby simplify the structure of the control system.

It is noted of course that if the operation speed of the computer is high, the values of f'(θ) and f''(θ) can be calculated ON TIME and controlled.

According to this method, even if the number of revolutions of the lathe is varied due to the processing force, the input can be corrected on the basis of momentary value of the number of revolutions. Therefore, the influence on the processing precision due to the variation of processing force is advantageously reduced. Many other excellent effects may be displayed.

It will be noted that the present invention is not only applied to the servo mechanism for effecting positioning by rectilinear motion as in the above-described embodiments but can be applied to a servo mechanism for positioning the tool 9 such as a cutting grinding wheel by vibrating a cantilever arm 7 by means of a cylinder 8.

Moreover, the method of the present invention can be widely applied to the processing of inner and outer peripheral surfaces and end surfaces by means of a cylindrical grinder, a depicting mechanism for a disc, etc., in addition to the processing of inner and outer peripheral surfaces and end surfaces by means of the lathe. Suitable tools, for example, such as laser, can be used. Accordingly, work is not limited to metal, but various materials such as wood, plastics, ceramic, clay, etc. can be processed.

What is claimed is:

1. A lathe and grinder for processing diverse shapes wherein the distance of a cutting tool from the center of rotation of a workpiece is controlled by numerical control, comprising:

means for detecting a rotational angle which generates N pulses every time a workpiece fully rotates, a computer housing therein N memories in which are pre-stored the positions of the tool for said every pulse generating angle according to shapes to be processed and the values of derivatives of at least the first order and second order of functions representative of said shapes to be processed, and a control mechanism for controlling positions of the cutting tool and grinding tool in accordance with the output of said computer, wherein the position of the cutting tool and derivatives are successively read from said memories for every pulse from said means for detecting the rotational angle to calculate a tool position signal, modified so as to obtain a transmission characteristic reverse to the transmission function of a servo system, used in controlling the position of the movable part, from said readout values and said modified position signal is output from said computer to said cutting tool position controlling mechanism.

2. In an apparatus having a rotatable article and a movable part wherein the distance from the center of rotation of said article is controlled to form a pre-designated closed curve on said article, an apparatus for forming diverse shapes, said apparatus comprising:

means for detecting a rotational angle of said rotatable article;

a memory means for storing a function value representative of said pre-designated closed curve shape corresponding to each rotational angle and a pre-calculated derivative value;

arithmetic operational means responsive to an output representative of a rotational angle from said detecting means for reading a function value and a derivative value from said memory means corresponding thereto, arithmetically generating a modified signal value so as to obtain a transmission characteristic reverse to a transmission function of a servo-mechanism, used in controlling the position of the movable part, from said read-out values, and outputting said modified signal for designating a position of said movable part forming said designated closed curve; and a control mechanism including said servo-mechanism for controlling the position of said movable part according to the output from said arithmetic operational means.

3. The apparatus according to claim 2, wherein said operational means which generates the modified signal having the reverse transmission characteristic of the servo mechanism comprises a computer for numerical control, and said modified signal is generated from said computer.

* * * * *